United States Patent Office 3,450,411
Patented June 17, 1969

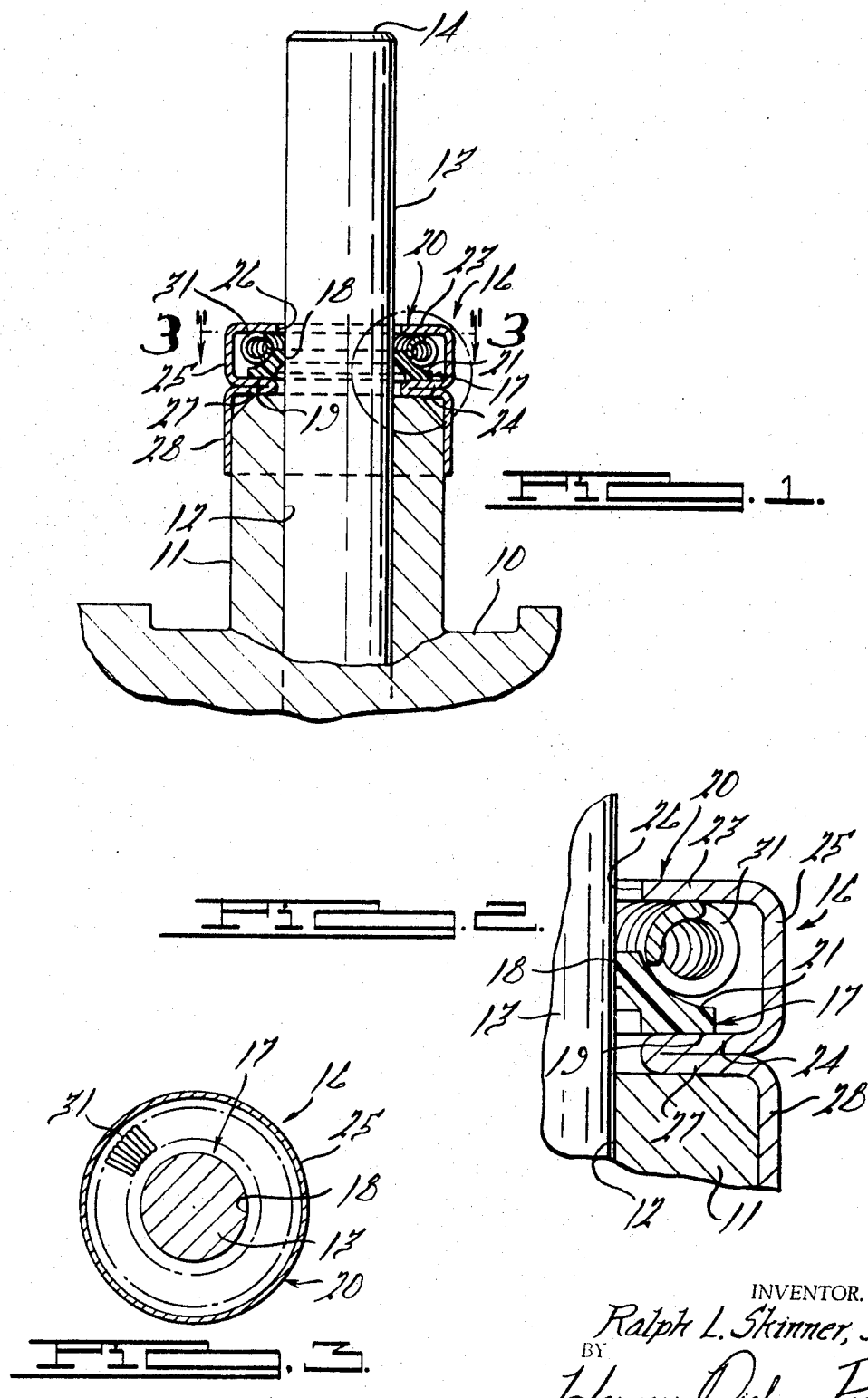

3,450,411
SEAL ASSEMBLY FOR VALVE STEMS AND
THE LIKE
Ralph L. Skinner, Sr., Birmingham, Mich., assignor to
Renniks Corporation, Birmingham, Mich., a corporation of Michigan
Filed Sept. 28, 1966, Ser. No. 582,743
Int. Cl. F16j; F16k 41/00; B65d 53/00
U.S. Cl. 277—48                                    5 Claims

ABSTRACT OF THE DISCLOSURE

A seal primarily adapted for valve stems of internal combustions engines comprising a one piece cylindrical member upset inwardly at the middle thereof and having an inturned upper flange, the portion of the cylindrical member below the upset defining a skirt which is adapted to be press fitted over the valve guide and the portion thereof between the upset and the flange defining a housing which contains a sealing element for the valve stem and means for exerting and maintaining pressure on the sealing element to hold the latter in sealing engagement with the valve stem.

---

This invention relates to a seal for restricting the passage of fluid along a shaft and is particularly adaptable for use as a seal for a valve stem of an internal combustion engine.

In an internal combustion engine the valve stem of each intake and exhaust valve is slidably mounted in the engine, with a valve head positioned on the end thereof projecting within the combustion chamber and with the other end projecting outwardly in a position to be actuated by a conventional rocker arm. During the intake cycle of the engine, a reduced pressure is created in the cylinder which tends to suck the oil lubricating the rocker arms around each valve stem into the combustion chamber where it is burned.

While seals of the prior art have been perfectly satisfactory for providing a seal around a valve stem and for preventing lubricating oil from entering the combustion chamber of an internal combustion engine, the present invention provides a compact seal with a minimum number of parts. It is particularly useful in areas where space is at a premium and where other more complicated seals are difficult to assemble. The relative simplicity of the seal of the present invention provides low manufacturing costs. Furthermore, assembly costs in assembling the seal in an engine are substantially reduced over other known prior art seals.

In the invention, and integrally formed housing member and support member for the seal is provided in which an annular housing having a pair of spaced end walls contains a sealing element having an annular sealing face adapted to be positioned in engagement with the shaft to be sealed. The annular face of the sealing element has a sealing force exerted against it by suitable means, for example, a garter spring that is positioned against a beveled surface of the sealing element and against one of the spaced end walls. This provides proper tensioning of the garter spring to force the annular sealing face into engagement with the shaft to be sealed.

A depending skirt preferably annular in form having a radially inwardly extending wall is formed integrally with this annular housing, with the radially extending inner wall being positioned parallel with one of the spaced end walls of the annular housing and being formed integrally with it. The spaced end walls and the radially inwardly extending wall from the skirt have openings positioned therein which are relatively larger than the shaft to be sealed to permit the shaft to reciprocate within the seal.

The integrally formed annular housing and supporting means in the form of the radially inwardly extending wall and the depending skirt are formed of a workable and somewhat resilient material, such as sheet metal, to provide sufficient flexibility to permit the seal to be properly positioned on a support member for the shaft that may be in the form of a valve guide. Thus, in assembly operations, the seal may be forced over the end of the shaft or valve stem until the radially inwardly extending end wall engages an end wall of the support or guide and the skirt depending from this radially inwardly extending end wall is firmly positioned around the support member or value guide. This positions the annular sealing face of the sealing element in a proper sealing position with respect to the shaft to be sealed in both radial and axial directions.

An object of the present invention is the provision of a seal for a shaft that is uncomplicated, inexpensive and that occupies a very minimum of space.

A further object of the invention is the provision of a seal for a valve guide which is easily assembled on the shaft and its supporting member.

Still another object of the invention is the provision of a valve seal in which a single piece housing and support are provided that has sufficient flexibility to permit the seal to be assembled or positioned around the shaft to compensate for any manufacturing variations in the seal, shaft or its support member.

Other objects and advantages of the present invention may be more readily realized as the specification is considered in connection with the attached drawings, in which:

FIGURE 1 is a sectional view of the seal, its shaft and a support member for the shaft;

FIGURE 2 is an enlarged partial sectional view taken at the circle 2 of FIGURE 1; and FIGURE 3 is a sectional view taken along the line 3—3 of FIGURE 1.

Although the seal of the present invention can be used to provide a seal for any rotating or reciprocating shaft, it is particularly useful for sealing the valve stems of the intake and exhaust valves of an internal combustion engine and it will therefore be described as it is used in such an engine. It should be realized, however, that the seal of the present invention has general applicability and is not limited in any sense for use in an internal combustion engine.

Referring now to the drawings in which like reference numerals designate like parts throughout the several views thereof, there is shown in FIGURE 1 one type of conventional overhead valve engine comprising a head 10 having an upstanding cylindrical portion 11 in the form of a valve guide. This valve guide has a central cylindrical aperture or bore 12 for receiving the valve stem 13 of either an exhaust or intake valve for the engine. The lower end of the valve stem 13 would be formed into a valve head (not shown) that would project into the combustion chamber of the engine (not shown). The upper end 14 of the valve stem 13 is adapted to be actuated by a conventional rocker arm (not shown) to open and close the valve.

In conventional internal combustion engines the upper end 14 of the valve stem would be exposed to lubricating oil introduced around the rocker arm to provide proper lubrication. To prevent oil from this area from being sucked into the combustion chamber, a seal 16 is positioned about the valve stem 13. The seal 16 comprises a sealing element or ring 17 of low friction material having an annular sealing face 18 positioned in engagement with the valve stem 13 and a lower sealing surface 19 positioned at substantially right angles to the annular sealing face 18. The sealing ring or element 17 is also provided with an upwardly and outwardly beveled pressure surface 21. The sealing element or ring 17 is formed of a low friction material, a number of which are satisfactory, but in the preferred embodiment of the present invention, a fluorocarbon resin material, for example, Teflon, is used because of its superior low friction characteristics and its resistance to heat and corrosion.

The sealing ring or element 17 is enclosed in an annular housing 20 having a first end wall 23 and a second spaced end wall 24 joined by an annular wall 25 that is generally parallel to the valve stem 13. The first end wall 23 has an aperture 24 positioned therein that has a relatively larger diameter than the diameter of the valve stem 13, and the lower wall or second wall 24 terminates outboard of the valve stem 13 to leave sufficient space to permit the valve stem 13 to reciprocate. Another radially extending wall 27 is formed integrally with the end wall 24 of the annular housing 20 and a depending annular skirt or wall 28 is integrally joined with the radially extending wall 27.

As can readily be seen by an inspection of the drawings, a garter spring 31 is positioned between the first end wall 23 of the annular housing 20 and the beveled pressure surface 21 of the sealing ring or element 17. This garter spring 31 is placed in tension by being forced down over the beveled surface 21 by the upper wall 23, preferably when the upper wall 23 of the annular housing 20 is spun over the spring. This action exerts an inward sealing pressure on the annular surface 18 and it also forces the lower sealing face 19 of the sealing ring 17 into engagement with the lower wall 24 of the annular housing.

In the manufacture of the seal 16, an annular workable sheet metal piece of substantially cylindrical form may be employed, and the lower wall 24 of the annular housing and the radially inwardly extending wall 27 may be formed in an upsetting operation. The inner diameter of the annular workable sheet metal piece should be substantially the same as the outer diameter of the valve guide or support member 11 which may be machined to receive the annular skirt or wall 28 in a press or interference fit relationship. Thereafter the sealing ring 17 may be positioned on the lower wall 24 so that the sealing or pressure surface 19 is in engagement with it. The garter spring may then be placed over the beveled surface 21 and the upper wall 24 of the annular housing may be formed by spinning the sheet metal that is in annular form over the garter spring 31. This forces the garter spring downwardly on the beveled surface 21 thereby forcing the pressure surface 19 into engagement with the lower wall 24 and exerting an inward sealing pressure on the annular sealing face 18 that is adapted to engage the valve stem 13.

The pressure or sealing surface 19 of the sealing element 17 that is in engagement with the lower wall 24, in addition to effecting a seal between the sealing element or ring 17 and the lower wall 24 of the annular housing, prevents the sealing ring 17 from cocking with respect to the annular housing thereby insuring that the inner annular sealing surface 18 engages the valve stem 13 in a proper sealing engagement. Due to the good antifriction properties of Teflon, or other similar materials used, the pressure between the pressure or sealing surface 19 and the lower wall 24 does not prevent easy sliding movement between these two surfaces. This material also provides easy sliding movement between the valve stem 13 and the inner annular sealing surface 18 of the sealing element or ring 17.

It can be appreciated that the annular or depending skirt 28 is positioned over the support or valve guide 11 for the valve stem 13 to properly position and support the annular housing and the sealing ring 17 in proper peripheral relationship with respect to the valve stem 13. The radially inwardly extending wall 27 that is integrally formed with the lower depending wall or skirt 28, engages the end of the support member or valve guide 11 to properly position the seal axially with respect to the valve stem 13. Because the depending annular wall 28, the radially inwardly extending wall 27 and preferably the annular housing 20, as well, are formed of a single piece workable sheet metal, for example, .010 in cold rolled steel, the seal assembly 16 has a certain amount of resilience. This will permit it to be easily positioned over the support member or valve guide 11 so that the sealing ring 17 is in proper position with respect to the valve stem 13. If there are any manufacturing tolerances or minor errors in the dimensions of any of the components, this inherent resiliency will still permit proper assembly and proper sealing action.

The sealing element 17 with its coacting garter spring 31 and the sealing action thereof is more fully described in my Patent No. 3,069,175, issued Dec. 13, 1962.

The present invention thus provides an inexpensive and uncomplicated seal for a shaft that occupies a very minimum of space in the environment in which it is used. This can readily be appreciated by an inspection of the drawings in which it can be seen that the peripheral dimension or, stated otherwise, the diameter of the seal 16 is substantially the same as the support or valve guide 11 and exceeds it only by the dimension of the sheet metal of which the depending skirt 28 and the annular housing are formed. Thus, in internal combustion engines where space is at a premium, this seal may be employed with great facility. Other seals found in the prior art that have outer spring arrangements such as that shown in my above-mentioned patent, cannot be so readily or easily employed.

The present invention can be of great value when used with a two-cycle internal combustion engine in which the exhaust valves operate at twice the speed of those in a four-cycle engine. This is true since the seal is of a self-contained static construction in which all critical surfaces are sealed by the spring energized fluorocarbon seal and are held in position without being affected by the speed of the engine or the motion of the valves.

It can also be appreciated that the present invention is relatively simple to assemble in an internal combustion engine or other environment in which it is used, and that it has the inherent capability of compensating for manufacturing variances in the shaft and its support member, for example, in the valve stem and the valve guide illustrated in the drawings.

While it will be apparent that the preferred embodiment of the invention herein disclosed is well calculated to fulfill the objects above stated, it will be appreciated that the invention is susceptible to modification, variation and change without departing from the proper scope of fair meaning of the following claims.

What is claimed is:

1. A seal assembly for sealing peripherally against a shaft that is supported in a guide having an outer surface, an end wall and a bore extending through the guide and the end wall, with the bore being adapted to receive the shaft, comprising a skirt adapted to be positioned over the outer surface of the guide in a press-fit relationship, a radially inwardly extending flange being integrally formed with said skirt and adapted to engage the end wall of the guide, an annular housing connected to said radially inwardly extending flange, said annular housing comprising integrally formed spaced end walls and an annular wall joining said spaced end walls, said radially inwardly extending flange being integrally formed with one of said spaced end walls and in engagement with the latter over substantially its entire surface, sealing means positioned in said annular housing and having a sealing surface adapted to engage the shaft, and means positioned in said annular housing and engaging said sealing means for exerting a sealing pressure on said sealing surface.

2. A seal adapted to seal a shaft that is supported in a support member having an outer annular surface and an end therefor through which the shaft protrudes comprising an annular sheet metal member having an internal diameter substantially equal to the outer diameter of the outer annular surface of the support member and having an upset central portion forming a first and a second radially inwardly extending wall terminating in an annular surface having a relatively larger diameter than the diameter of the shaft, said first and said second radially inwardly extending walls being positioned in engagement, an annular skirt extending in one direction from said first radially inwardly extending wall and an annular wall extending from said second radially inwardly extending wall, means cooperating with said annular wall to farm an annular housing together with said second radially inwardly extending wall, a sealing element having an annular sealing face adapted to engage the shaft positioned in said annular housing, means contained within said annular housing and engaging said sealing element for exerting a sealing force on said annular sealing face, said annular skirt being adapted to be press-fitted over said outer annular surface of the support member to position said annular face of said sealing element peripherally around the shaft, and said first radially inwardly extending wall being adapted to engage the end wall of the support to position the sealing element axially with respect to the shaft.

3. The combination of claim 2 in which said means cooperating with said annular wall to form said annular housing comprises an integrally formed spun-over end wall substantially parallel to said first and said second radially inwardly extending walls.

4. The combination of claim 3 in which sealing element has an upwardly and outwardly facing beveled pressure surface positioned around said annular sealing face and a garter spring under tension is positioned around and in engagement with said upwardly and outwardly facing beveled pressure surface and with said integrally formed spun-over end wall.

5. The combination of claim 4 in which said sealing element has sealing pressure surface positioned in a plane substantially perpendicular to said annular sealing face, said sealing pressure surface being positioned in sealing engagement with said second radially inwardly extending wall by the pressure exerted on said garter spring through said integrally formed spun-over end wall.

References Cited

UNITED STATES PATENTS

| | | | |
|---|---|---|---|
| 2,157,867 | 5/1939 | Robertson et al. | 277—187 X |
| 3,069,174 | 12/1962 | Skinner | 277—48 |
| 3,306,621 | 2/1967 | Fisher | 277—80 |
| 3,333,578 | 8/1967 | Muller | 277—153 |

SAMUEL ROTHBERG, *Primary Examiner.*

U.S. Cl. X.R.

123—188; 277—187